(12) United States Patent
Kandler et al.

(10) Patent No.: US 11,292,501 B2
(45) Date of Patent: Apr. 5, 2022

(54) STEERING WHEEL FOR A MOTOR VEHICLE

(71) Applicant: Joyson Safety Systems Germany GmbH, Aschaffenburg (DE)

(72) Inventors: Marcus Ted Kandler, Aschaffenburg (DE); Achim Hartlaub, Großwallstadt (DE)

(73) Assignee: Joyson Safety Systems Germany GmbH, Aschaffenburg (DE)

( * ) Notice: Subject to any disclaimer, the term of this patent is extended or adjusted under 35 U.S.C. 154(b) by 689 days.

(21) Appl. No.: 16/083,826

(22) PCT Filed: Mar. 9, 2017

(86) PCT No.: PCT/EP2017/055582
§ 371 (c)(1),
(2) Date: Sep. 10, 2018

(87) PCT Pub. No.: WO2017/153536
PCT Pub. Date: Sep. 14, 2017

(65) Prior Publication Data
US 2020/0339175 A1     Oct. 29, 2020

(30) Foreign Application Priority Data
Mar. 11, 2016 (DE) .......................... 102016204105.3

(51) Int. Cl.
*B62D 1/04* (2006.01)
*B62D 1/06* (2006.01)
(Continued)

(52) U.S. Cl.
CPC ............. *B62D 1/065* (2013.01); *B62D 1/046* (2013.01); *B60K 2370/782* (2019.05); *B62D 7/222* (2013.01); *F16F 15/005* (2013.01)

(58) Field of Classification Search
CPC .......... B62D 1/046; B62D 1/06; B62D 1/065; B62D 7/222; B60K 2370/782; B29L 2031/3047; F16F 15/005
See application file for complete search history.

(56) References Cited

U.S. PATENT DOCUMENTS

| 4,210,905 A | 7/1980 | Coons |
| 6,976,403 B2 | 12/2005 | Oblizajek et al. |

(Continued)

FOREIGN PATENT DOCUMENTS

| CN | 103419840 A | 12/2013 |
| DE | 19539847 C1 | 1/1997 |

(Continued)

OTHER PUBLICATIONS

Machine translation of DE 19539847 C1 obtained on Mar. 4, 2021.*

(Continued)

*Primary Examiner* — Adam D Rogers
(74) *Attorney, Agent, or Firm* — Fitch, Even, Tabin & Flannery LLP

(57) ABSTRACT

It is provided a steering wheel for a motor vehicle having a steering-wheel frame and at least one element for setting the vibration frequency and/or the inertia of the steering wheel. The at least one element is electrically conductive and is part of a sensor element.

17 Claims, 14 Drawing Sheets

(51) Int. Cl.
*B62D 7/22* (2006.01)
*F16F 15/00* (2006.01)

(56) References Cited

U.S. PATENT DOCUMENTS

| | | | |
|---|---|---|---|
| 7,898,530 B2 | 3/2011 | Trachte | |
| 8,406,438 B2* | 3/2013 | Ihl | F16F 15/005 381/190 |
| 2008/0134832 A1* | 6/2008 | Matsu | B62D 1/06 74/552 |
| 2009/0199676 A1 | 8/2009 | Kandler | |
| 2013/0317699 A1 | 11/2013 | Urhahne | |

FOREIGN PATENT DOCUMENTS

| | | | | |
|---|---|---|---|---|
| DE | 102006031207 B3 | 11/2007 | | |
| DE | 102007026065 A1 | 12/2008 | | |
| DE | 102008007162 A1 | 8/2009 | | |
| DE | 102007024141 B4 | 11/2014 | | |
| DE | 102014007538 A1 | 11/2014 | | |
| DE | 102017108429 A1 * | 10/2018 | | B62D 1/06 |
| EP | 2477018 A1 | 7/2012 | | |
| EP | 2611642 A2 | 7/2013 | | |
| WO | 2012045379 A2 | 4/2012 | | |

OTHER PUBLICATIONS

Machine translation of DE 102008007162 A1 obtained on Mar. 4, 2021.*
Machine translation of DE 102014007538 A1 obtained on Mar. 4, 2021.*
Machine translation of EP 2477018 B1 obtained on Mar. 4, 2021.*
EPO; International Application No. PCT/EP2017/055582; International Search Report dated Aug. 23, 2017.
CNIPA; Application No. 201780016061.9; Notification of First Office Action dated Oct. 12, 2020.

* cited by examiner

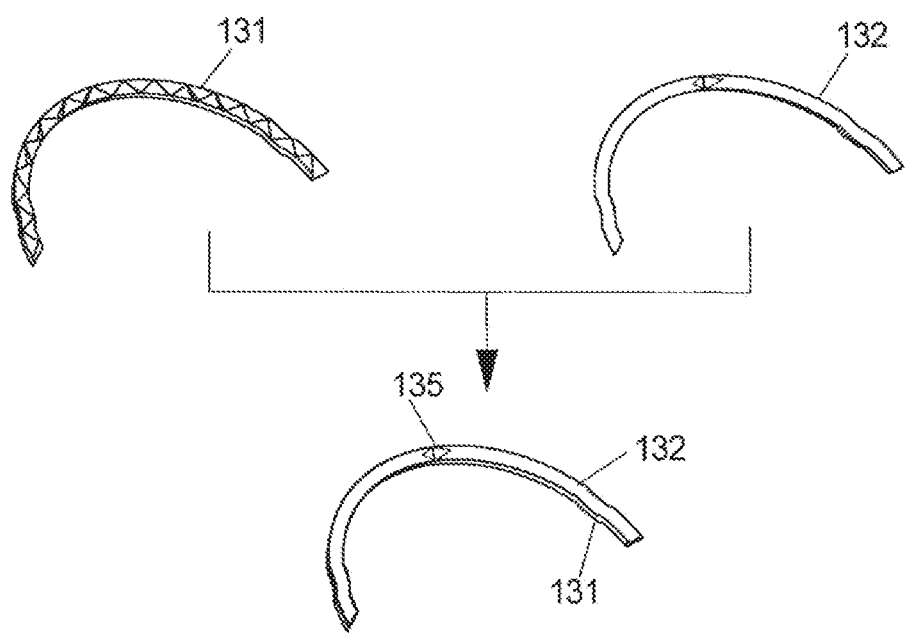
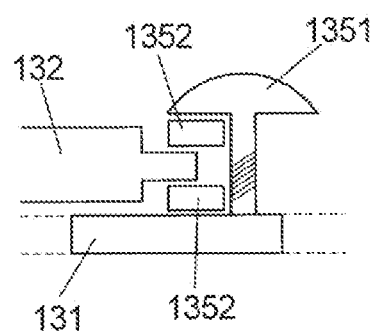

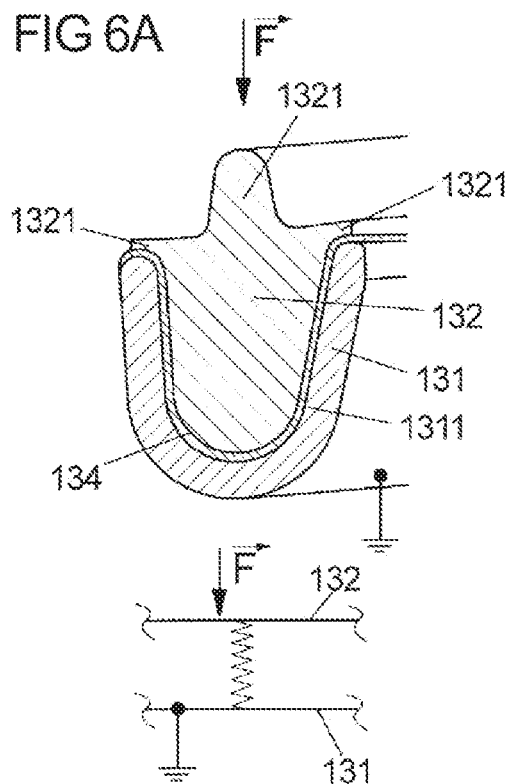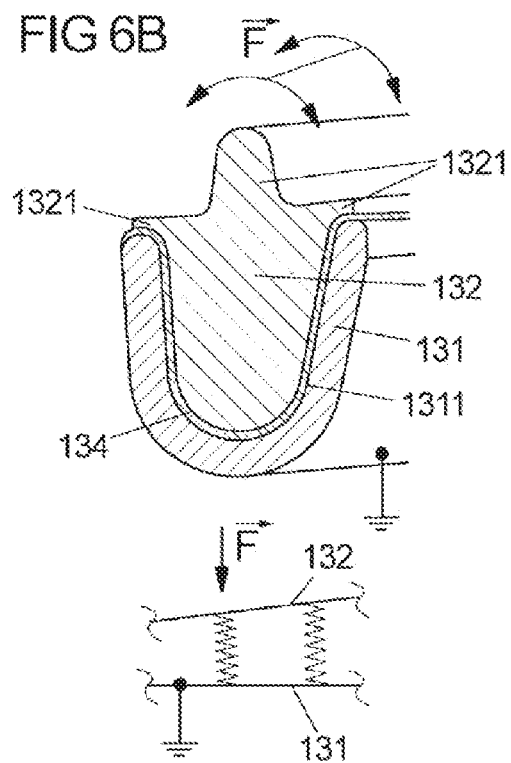

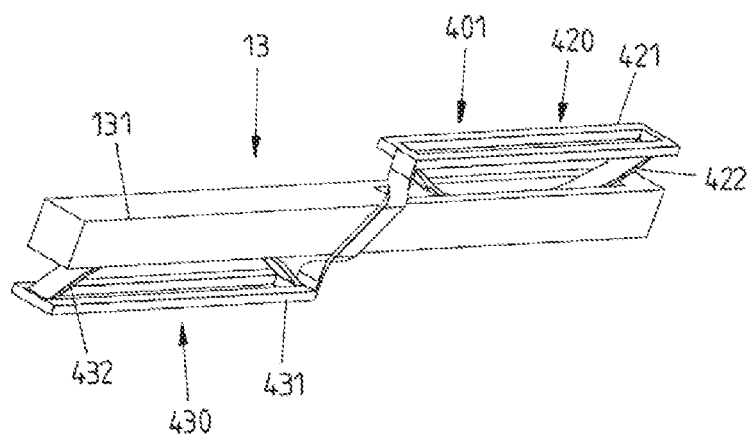
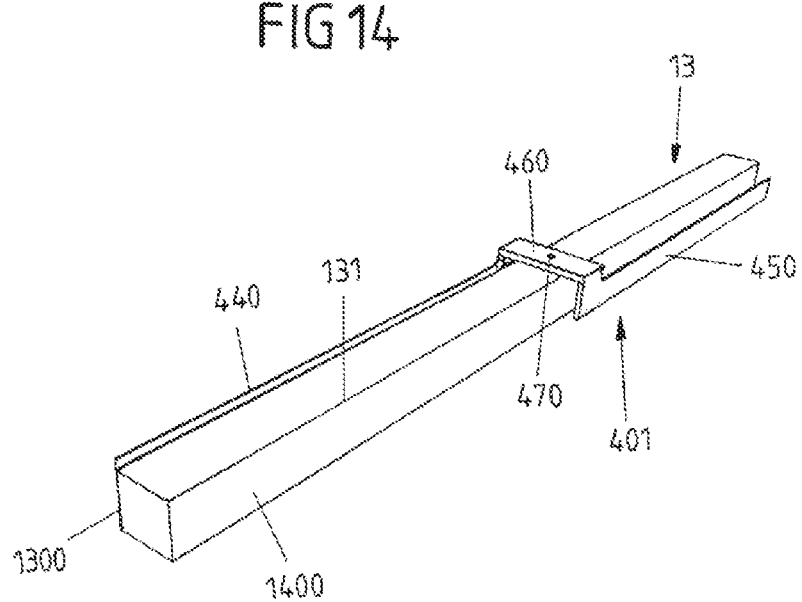

STEERING WHEEL FOR A MOTOR VEHICLE

CROSS-REFERENCE TO RELATED APPLICATIONS

This application is a U.S. national phase application filed under 35 U.S.C. § 371 of International Application PCT/EP2017/055582, filed on Mar. 9, 2017, designating the United States, which claims priority from German Application Number 10 2016 204 105.3, filed on Mar. 11, 2016.

BACKGROUND

The invention relates to a steering wheel for a motor vehicle, having a steering-wheel frame and at least one element for setting the vibration frequency and/or the inertia of the steering wheel and to a steering wheel, having a steering-wheel frame and a sensor element.

An element for setting the vibration frequency and/or the inertia of the steering wheel can be inserted into a steering wheel in order to influence the weight of the steering wheel such that visible and/or perceptible vibrations which occur during driving are for the most part prevented, this resulting in the vehicle driver's comfort being increased. An element of this type can also be used in order to influence the inertia of the steering wheel such that, following a steering movement (rotation) of the steering wheel, a desired restoring movement guides the steering wheel back into the straight-ahead position.

It is increasingly the case that steering wheels are being equipped with control and/or safety functions. These are laboriously integrated in the steering wheel, which considerably increases the costs for a steering wheel.

SUMMARY

The present invention is based on the object of providing a steering wheel which has at least one additional function and can be produced as cost-effectively as possible.

This object is achieved by a steering wheel having features as described herein.

Accordingly, the steering wheel for a motor vehicle comprises a steering-wheel frame and at least one element for setting the vibration frequency and/or the inertia of the steering wheel. The expression setting the vibration frequency and/or the inertia of the steering wheel should not be understood as being just any way of the vibration frequency and/or the inertia being influenced as a result of the mass of an element. Rather, it involves the vibration frequency and/or the inertia being specifically controlled or set. It is thus possible for the element to shift the vibration frequency of the steering wheel for example such that the vehicle driver, when driving, is aware of barely any steering-wheel vibrations, or of none at all. For this purpose, the element can comprise (at least in part) a material of low mass density. As an alternative, or in addition, the element can provide the steering wheel with a moment of inertia which ensures a sufficient restoring moment and guides the steering wheel from a steering position into a straight-ahead position when the vehicle driver is not subjecting the steering wheel to any force. For this purpose, the element (at least in part) has preferably a high mass density, in order to provide the steering wheel with the desired weight. This makes it possible to increase safety.

The steering wheel according to the invention is distinguished in that the at least one element is electrically conductive and is part of a sensor element. It is possible here for the entire element to be electrically conductive, that is to say to be produced entirely from an electrically conductive material/composite, or for just part of the element to be electrically conductive. In the latter case, use can be made, for example, of an electrically conductive material in combination with an electrically non-conductive material. The at least one element of the steering wheel according to the invention therefore serves not just to set the vibration frequency and/or the inertia of the steering wheel; as a sensor element, it can also perform other functions. The selection of the material (for example in respect of the density thereof) for the at least one element makes it possible to influence the strength and deformability, and the weight, of the steering wheel.

According to one embodiment, the sensor element can be designed, in particular, to determine a vehicle driver's hand placement on the steering wheel. The expression hand placement covers the placement both of the entire hand and of one or more fingers. Such a sensor element serves, for example, for monitoring and safety purposes. It is thus possible, for example throughout the duration over which the vehicle driver's hand/fingers is/are placed on the steering wheel, to monitor the steering time and, when a predetermined duration is exceeded, to trigger an alarm signal, which encourages the vehicle driver to take a break. It is also possible to monitor, for example for the purpose of detecting whether the vehicle driver is falling/has fallen asleep, whether, during travel, there is always at least one hand/a certain number of fingers placed as intended on the steering wheel. Furthermore, by means of determining whether the vehicle driver's hand is placed on the steering wheel, the sensor element can serve to trigger vehicle functions (light, horn, wipers, center-console operation, driver assistance system, etc.) in a specific manner.

According to one embodiment, (at least part of) the at least one element is formed in a manner which complements at least one portion of the steering-wheel frame. It is thus possible for the at least one element and the corresponding portion of the steering-wheel frame to be arranged in relation to one another such that they are spaced apart from one another by essentially the same distance over their entire extent.

It is preferable here for the at least one element and the steering-wheel frame to be arranged so that an interspace is formed between the at least one element and the steering-wheel frame. On the one hand, this makes it possible to compensate for production tolerances of the element and of the steering-wheel frame. On the other hand, it is thus possible to avoid electrical and/or thermal contacts between the element and the steering-wheel frame. Thus, an electrically non-conductive material can be arranged, for example, in the interspace. In particular when, in addition to the at least one element, the steering-wheel frame is also electrically conductive, it is thus possible for the at least one element and the steering-wheel frame to be insulated electrically from one another. The electrically non-conductive material can be arranged in the form of a separate layer between the at least one element and the steering-wheel frame. As an alternative, the electrically non-conductive material can be applied to the at least one element or the steering-wheel frame (on the side which is directed toward the steering-wheel frame or the at least one element) before the at least one element and the steering-wheel frame are arranged as intended in relation to one another.

It is also conceivable for at least one spring (e.g. a leafspring or helical spring or some other spring), via which the element can be subjected to a restoring force, to be arranged in the interspace, wherein the element is coupled to the steering-wheel frame in particular via the spring. It is also possible for the steering wheel according to the invention to have a spring which forms the element for setting the vibration frequency and/or the inertia of the steering wheel.

The electrically non-conductive material can be used, in particular, when the sensor element is based on a capacitive or inductive measurement principle. If the sensor element is based on a resistive measurement principle, the electrically non-conductive material is dispensed with.

According to one embodiment, a compressible material is arranged in the interspace. In particular, the electrically non-conductive material can be compressible. It is possible for the pressure which stems for example from the vehicle driver's hand being placed on the steering wheel to compress the compressible material and thus to vary the distance between the at least one element and the steering wheel frame. It is also possible for the compressible material to be arranged in the form of a separate layer between the at least one element and the steering-wheel frame, or to be applied to one of these, before the at least one element and the steering-wheel frame are arranged as intended in relation to one another.

The electrically non-conductive and/or compressible material can be, for example, a plastic film, which is positioned between the steering-wheel frame and the at least one element prior to these two being joined together. As an alternative, the electrically non-conductive and/or compressible material can be silicone or an (electrically non-conductive) foam. The foam can be injected between the steering-wheel frame and the at least one element, once the latter have been arranged as intended in relation to one another. The foam used can be, for example, polyurethane foam or foamed rubber. It is also possible to use a mixture of polyurethane and rubber or some other suitable polymer foam.

The at least one element can be fastened on the steering-wheel frame, wherein the at least one element and the steering-wheel frame are connected in a preferably electrically non-conductive manner. The connecting means provided can be, for example, one or more screws. Fastening here takes place preferably such that the at least one element is movable (at least minimally) in relation to the steering-wheel frame at least outside the fastening region. It is possible here for the fastening means to connect the at least one element and the steering-wheel frame to one another in a fixed or movable manner within the fastening region. For example, it is possible for an element to be fastened centrally (as seen along its longitudinal extent) on the steering-wheel frame. The two ends of the element are free here and can be moved by hand pressure in the direction of the steering-wheel frame. This movement can be measured by the sensor element.

According to a further embodiment, the steering wheel can have a plurality of elements which are electrically conductive and are insulated electrically from one another. The individual elements can be spaced apart from one another in order to be insulated electrically from one another. It is also possible for an electrically non-conductive material to be provided between the elements. The individual elements can be distributed over the steering-wheel frame. The elements can all be part of the sensor element. Therefore, for example the number, size and/or shape of the elements can be selected such that the latter extend essentially over the entire steering-wheel frame. The arrangement of a multiplicity of elements means that it is possible for the sensor element not only to measure the occurrence of an event, but also to resolve the same spatially. This means that it is possible, for example, not just to ascertain whether a hand is placed on the steering wheel, but also to establish the position of the hand on the steering wheel. The number of elements can influence the spatial resolution of the measurement signal which stems from the placement of the hand on the steering wheel. It is thus also possible to determine the size of the surface area over which the hand, hands or fingers is/are placed, and/or the force applied, and to draw a conclusion as to the number of fingers in contact with the steering wheel. It is also possible for a plurality of elements to determine movements of the hand/hands, so as to establish for example whether the movement is identical/similar to a movement which would be expected when a vehicle driver is falling asleep. If appropriate, an alarm signal can be triggered in order to wake the vehicle driver or to prevent him from falling asleep. Finally, different elements can be assigned to different vehicle functions (e.g. light, horn, wipers, etc.), which the vehicle driver can control by making contact with the appropriate region of the steering wheel. It is particularly advantageous here for the vehicle driver not to lose contact with the steering wheel when activating the functions. The individual elements can differ (at least to some extent) in shape and size. As an alternative, they can be of the same shape and size. In addition, the number of elements can be selected freely as required. Furthermore, the individual elements differ in respect of measurement sensitivity. It is thus possible, for example, for the individual elements to be arranged at different distances from the steering-wheel frame, so that electrically non-conductive material of different thicknesses can be arranged in the interspace between the steering-wheel frame and the individual elements.

In addition to the at least one electrically conductive element, it is possible to provide at least one element which, although it contributes to setting the vibration frequency and/or the inertia of the steering wheel, is not electrically conductive and is thus not part of the sensor element. Such an electrically non-conductive element can be arranged, for example, between two electrically conductive elements and can insulate these electrically from one another.

According to one embodiment, the steering-wheel frame has at least one groove, which is formed along a direction in which the steering-wheel frame extends. At least part of the at least one element, if the latter is designed in the form of an inlay, is arranged in the at least one groove. The at least one inlay preferably projects beyond the groove in a plane transverse to the direction in which the groove extends. It is thus possible for the at least one inlay to have one or more lever-like protrusions located in the aforementioned plane. If the vehicle driver places his hand on the steering wheel, the protrusions are subjected to a force. The lever action of the protrusions (despite the low-level action of force) moves the at least one inlay in relation to the steering-wheel frame and generates a measurement signal. If a plurality of grooves and a plurality of inlays are provided, then an inlay can extend in each groove.

If the at least one element is designed in the form of an overlay, the latter envelops the steering-wheel frame at least in part.

According to one embodiment, the steering wheel comprises a steering-wheel rim, via which the vehicle driver can grip the steering wheel. The steering-wheel rim is connected to the steering-wheel hub via at least one steering-wheel spoke. The steering-wheel rim can comprise the at least one element and a portion of the steering-wheel frame, and therefore contact with/gripping of the steering-wheel rim in the region of the at least one element generates a measurement signal. It is also possible for the at least one element, in addition, to be part of the at least one steering-wheel spoke and/or of the steering-wheel hub.

According to a further embodiment, the steering-wheel frame and the at least one element can form electrodes of the sensor element for capacitive, inductive or resistive measurement (for example in the form of a complex model), in particular to determine whether the vehicle driver's hand is placed on the steering wheel. The steering-wheel frame (at least one element) can be at ground potential here, while the at least one element (steering-wheel frame) is at a potential which differs from that of the steering-wheel frame (at least one element). Capacitive measurement is particularly preferred here.

The capacitive sensor element integrated in the vehicle steering wheel can be connected to an evaluation unit, which senses and evaluates a measurand in dependence on the capacitive coupling of the capacitive sensor element to a reference potential formed by a suitable vehicle element or steering-wheel element. The evaluation unit can likewise be integrated in the vehicle steering wheel or, as alternative, can form an external element. The placement of a hand on the steering wheel changes the capacitive coupling of the sensor element to the reference potential, which results in the measurand changing. The extent of the change can depend, for example, on whether there are five fingers gripping the steering wheel or it is only the fingertips which are lightly in contact therewith.

According to a further embodiment, the steering wheel can have a heating element in addition to the steering-wheel frame and the at least one element. Said heating element can serve to heat the steering wheel and thus to increase the vehicle driver's comfort. The heating element can be, in particular, part of the steering-wheel rim. It is possible for the heating element to be of planar design and to envelop the steering-wheel frame and the at least one element (at least in part).

In order to provide, in particular, the steering-wheel rim with a certain volume, the steering wheel can also comprise at least one foam layer. In order to create an esthetically pleasing outer surface, the steering wheel can additionally comprise a cover, produced for example from leather. As an alternative, or in addition, it is possible for the steering wheel to have, on (parts of) its outer surface, a decorative panel (for example made of wood), which projects (at certain points) into the steering wheel, this providing for improved contact with the at least one element. The steering wheel, and in this case in particular the steering-wheel rim, can comprise, for example, the following components: a steering-wheel frame, an element inserted into the frame, a first foam layer, a heating element, a second foam layer and a cover. The individual elements here can be arranged in the order stated. It is generally possible for the aforementioned layers to form a steering-wheel rim in a technically advantageous manner (as far as number and order are concerned).

According to a further embodiment, in addition to the steering-wheel frame and the at least one element, it is also possible for the heating element to be part of the sensor element. Therefore, for example the heating element, for inductive-measurement purposes, can be wound in a coil-like manner around the steering-wheel frame and the at least one element. In the case of capacitive measurement, the change in the distance between the heating element and the steering-wheel frame and the at least one element can generate a measurement signal.

As far as a further aspect is concerned, the invention relates to a steering wheel, in particular a steering wheel designed as described above, having a steering-wheel frame and a sensor element, wherein the sensor element comprises at least one elastic and/or elastically mounted component, which is arranged, at least to some extent, within the steering-wheel frame or in an aperture of the steering-wheel frame and/or which extends, at least to some extent, outside, and along, the steering-wheel frame (e.g. along the circumferential direction of the steering-wheel rim). The aperture is, for example, a depression formed in the steering-wheel frame. However, it is also conceivable for the aperture to be designed in the form of a through-opening, wherein the elastic and/or elastically mounted component extends, for example, through said through-opening.

The component is, for example, of electrically conductive design and constitutes, in particular, one electrode of a capacitive sensor. The second electrode of this sensor is the steering-wheel frame. For example, the component is a spring, e.g. a leaf spring or helical spring or some other spring. For example, use is made of a leaf spring with a thickness between 0.01 and 0.03 mm.

According to a development of the invention, the component has a first sub-region extending within the steering-wheel frame, or in an aperture of the steering-wheel frame (i.e. in the form of an "inlay"), and has a second sub-region extending outside the steering-wheel frame (in particular in the form of an "onlay").

The component has, for example, two portions (in particular its end portions) connected to the steering-wheel frame. It is also conceivable for at least part of the component to run in an aperture of the steering-wheel frame and to be connected there to the steering-wheel frame.

Furthermore, the component can have a first portion and a second portion, which is connected elastically to the first portion, wherein the second portion is curved and is located, in particular, in abutment with the steering-wheel frame. The second portion of this "inherently resilient" component is produced, in particular, by being cut out of a flat material blank (e.g. from a metal plate).

It is also possible for the component to have a first sub-region extending on a first side of the steering-wheel frame and to have a second sub-region extending on a second side of the steering-wheel frame, said second side being directed away from the first side. The first side is, for example, the front side of the steering-wheel frame, e.g. that side of the steering-wheel frame which, within the vehicle, is directed toward the vehicle driver, whereas the second side is formed, accordingly, by the rear side of the steering-wheel frame.

The first sub-region and the second sub-region are connected to one another, in particular, via a connecting portion, wherein the component is mounted (e.g. in a pivotable and/or elastic manner) on the steering-wheel frame, for example, via the connecting portion.

Those configurations of the invention which have been explained above in conjunction with the first aspect of the invention can, of course, be realized in an analogous manner in the steering wheel according to the second aspect of the invention. For example, at least one element for setting the vibration frequency and/or the inertia of the steering wheel is coupled to the steering-wheel frame via the component. It is also possible, however, for the component itself to form at least one element for setting the vibration frequency and/or the inertia of the steering wheel.

BRIEF DESCRIPTION OF THE DRAWINGS

The invention will be explained in more detail hereinbelow with reference to the figures and on the basis of a number of exemplary embodiments.

FIG. 3 shows, schematically, a plan view of a portion of the steering-wheel frame and of the inlay from FIG. 2, both separately and in a connected-together state.

FIG. 4 shows, schematically, an embodiment of a fastening means for fastening the inlay on the steering-wheel frame from FIG. 2.

FIG. 6A shows an example of the action of force on the steering-wheel rim from FIG. 2.

FIG. 6B shows a further example of the action of force on the steering-wheel rim from FIG. 2.

FIG. 13 shows a modification of FIG. 12.

FIG. 14 shows, schematically, a perspective view of a portion of a rim of a steering wheel according to yet another exemplary embodiment of the invention.

DETAILED DESCRIPTION

Figure 1:
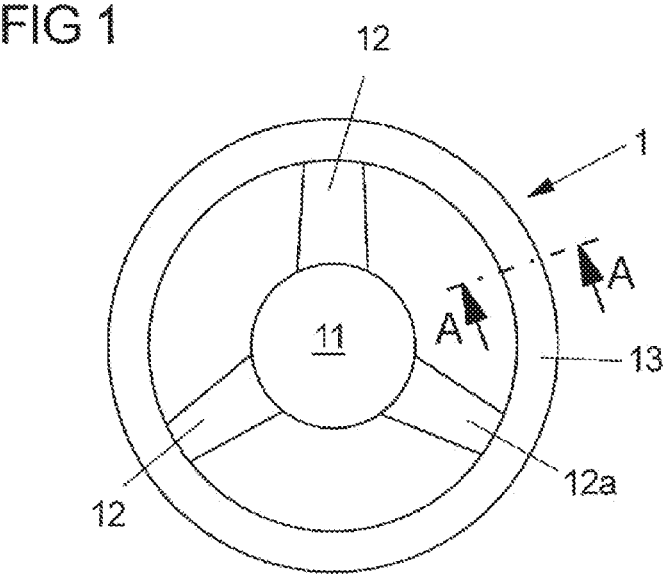
FIG. 1 shows a schematic illustration of a vehicle steering wheel having a steering-wheel rim.

FIG. 1 shows, schematically, a plan view of a steering wheel 1. The steering wheel 1 comprises a central steering-wheel hub 11, from which three steering-wheel spokes 12 extend. The steering wheel 1 also comprises a steering-wheel rim 13, which is connected to the steering-wheel hub 11 via the steering-wheel spokes 12.

Figure 2:
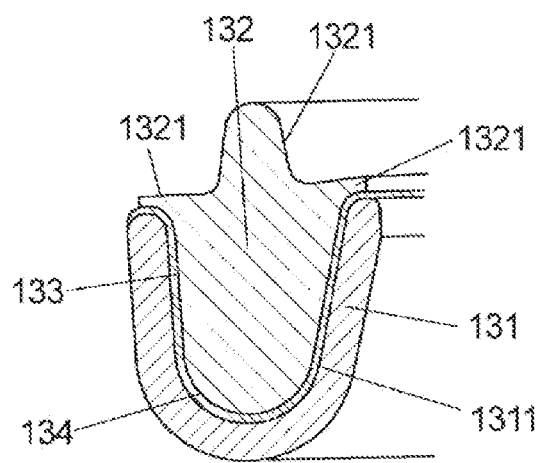
FIG. 2 shows, schematically, a cross section through a steering-wheel rim having a steering-wheel frame and an element in the form of an inlay according to one embodiment.

As illustrated in FIG. 2, the steering-wheel rim 13 comprises, inter alia, a steering-wheel frame 131 and an element 132. In the embodiment from FIG. 2, the element 132 is designed in the form of an inlay. The steering-wheel frame 131 extends beyond the steering-wheel rim 13, to be precise into the steering-wheel spokes 12 and the steering-wheel hub 11 (not illustrated). FIG. 2 is a sectional illustration taken along line A-A through the steering-wheel rim 13 from FIG. 1, between two steering-wheel spokes 12. For the sake of clarity here, any additional elements (for example a heating element, a foam layer, a decorative panel or a cover) have not been illustrated. In the exemplary embodiment from FIGS. 1 and 2, the steering-wheel frame 131 and the element 132 each extend over the entire length of the steering-wheel rim (as seen in the circumferential direction of the steering-wheel rim). It is preferably the case that the steering-wheel frame 131 extends always over the entire length, whereas the element 132 can extend only over part of this length. In this case, it is possible to provide one or more further elements which, as seen in the circumferential direction, adjoin one another and together extend, for example, over the entire length of the steering-wheel rim 13. It is possible here for a distance to be provided between the individual elements 132 in each case, so that electrical contact between the elements 132 is avoided. Furthermore, the element 132 can also extend into the spokes 12.

The steering-wheel frame 131 can be produced from a metal or a plastic having an electrically conductive element or comprising electrically conductive carbon. The steering-wheel frame 131 is always an electrically conductive structure. The steering-wheel frame 131 is preferably at ground potential. The steering-wheel frame 131 has a honeycomb structure, as illustrated by way of example in FIG. 3. As an alternative, the steering-wheel frame 131 may be of solid design. As can be seen, in particular, in FIG. 2, the steering-wheel frame 131 has a U-shaped cross section with a groove 1311. The groove 1311 extends over the entire length of the steering-wheel frame 131 (as seen in the circumferential direction of the steering-wheel rim). The element 132 is arranged in the groove 1311. The length of the element 132 is adapted to the length of the groove 1311. The element 132 has a shape which complements that of the groove 1311 of the steering-wheel frame 131 (FIGS. 2 and 3). The shape of the element 132 is freely selectable on that side of the element 132 which is directed away from the groove 1311. In the exemplary embodiment from FIG. 2, on said side which is directed away from the groove, the element 132 has, as seen in cross section, three protrusions 1321, which are each oriented essentially perpendicularly to one another. The two protrusions 1321 which are adjacent to the steering-wheel frame 131 here do not project beyond the outer surface of the steering-wheel frame 131. Rather, they have a length which is dimensioned such that the protrusions 1321 terminate before the outer surface. As an alternative, they can terminate flush with the outer surface of the steering-wheel frame 131. The number of protrusions 1321 can also be other than three. It is thus possible to provide, for example, zero, one, two or more than three protrusions 1321. The protrusions 1321 each extend over the entire length of the element 132. The shape of the protrusions 1321 is illustrated merely by way of example in FIG. 2. It is thus also possible for them to have a shape, length and/or width different to those in FIG. 2. The function of these protrusions will be described at a later stage in the text in conjunction with FIGS. 6a) to c).

The element 132 is produced from an electrically conductive material, in particular from a metal. The mass density of the material used is selected here such that the element 132 provides the steering wheel 1 with the desired weight and/or inertia. As illustrated in FIG. 3, on the side which is directed toward the steering-wheel frame 131, the element 132 has a shape which complements the honeycomb structure of the steering-wheel frame 131.

An interspace 133 is provided between the element 132 and the steering-wheel frame 131, in order to avoid electrical contact between the element 132 and the steering-wheel frame 131 and to define a contact resistance. In the exemplary embodiment from FIG. 2, an electrically non-conductive film 134 is arranged in the interspace 133, in order to avoid the situation where electrical contact is established between the element 132 and the steering-wheel frame 131 when there is a change in distance between the two.

As illustrated in FIG. 3, the element 132 and the steering-wheel frame 131 are connected to one another via a fastening means 135. FIG. 3 here illustrates merely an upper portion of the element 132 and of the steering-wheel frame 131.

FIG. 4 shows an exemplary embodiment of the fastening means 135. The fastening means 135 here comprises a screw 1351, of which the thread interacts with a threaded bore of the steering-wheel frame 131, and an insulation element 1352. The screw 1351 here projects through an opening in the element 132 and uses its head to push the element 132 against the steering-wheel frame 131. The insulation element 135 serves to insulate the element 132 electrically from the screw 1351 and the steering-wheel frame 131. The insulation element 1352 can comprise, for example, two shims, which are arranged between the element 132 and the steering-wheel frame 131, on the one hand, and between the element 132 and the head of the screw 1351, on the other hand (FIG. 4). In order to accommodate the shims, the element 132 can thus have a reduced material thickness in the region around the opening(s). It is also possible for the two shims (while maintaining the arrangement from FIG. 4) to be connected to one another by a sleeve, of which the diameter corresponds, for example, to the internal diameter of the shims. Such an insulation element 1352 can be formed, in particular, in one piece.

As an alternative, the fastening means 135 can be an adhesive.

Figure 5B:
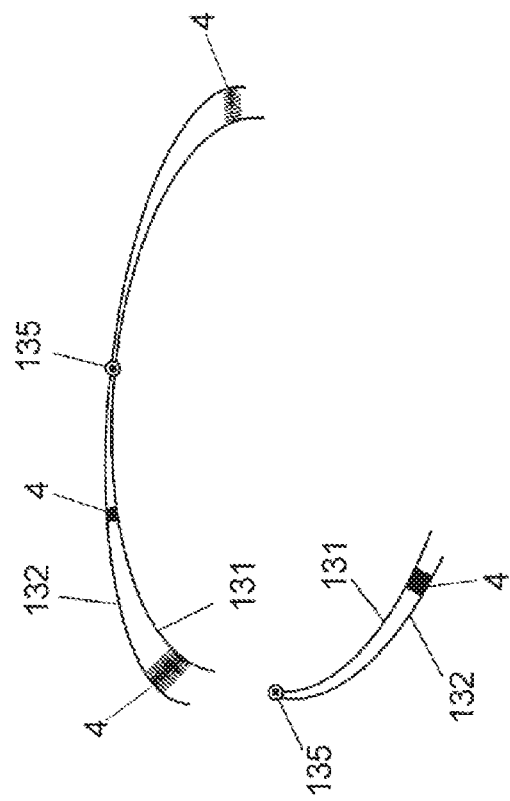
FIG. 5B shows a further embodiment for the arrangement of two fastening means from FIG. 4.
Figure 5A:
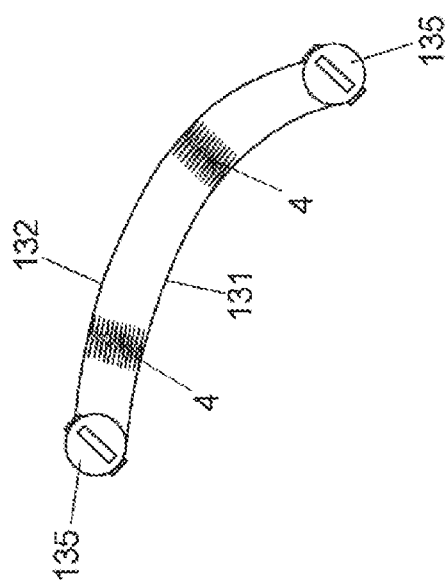
FIG. 5A shows an embodiment for the arrangement of two fastening means from FIG. 4.

FIGS. 5a) and b) illustrate different options for the arrangement of a plurality of fastening means 135. FIG. 5a) has, by way of example, two fastening means 135, which are spaced apart from one another along the length of the steering-wheel frame 131. For example, over the entire portion between the two fastening means 135, the distance between the steering-wheel frame 131 and the element 132 in the rest state is constant. The placement of a hand on the steering wheel in a region between the two fastening means 135 decreases the distance between the steering-wheel frame 131 and the element 132 in this region, as a result of which a measurement signal is generated. As an alternative, further fastening means 135 can be provided. According to one embodiment, the element 132 can be mounted by way of the fastening means 135 such that the placement of a hand on the steering wheel in a region between the two fastening means 135 decreases the distance between the element 132 and the steering-wheel frame 131, for example the distance decreasing to the same extent over the entire portion between the two fastening means 135.

As an option, at least one spring 4 (e.g. in the form of a helical spring or leaf spring) is located between the steering-wheel frame 131 and the element 132, the spring moving the element 132 back into the rest state following actuation (by hand placement). In addition, or as an alternative, to the spring 4, it is also possible for an elastic material (analogous to the compressible material 134) to be arranged between the steering-wheel frame 131 and the element 132. In particular it is possible to provide a spring 4 of which the elastic properties decrease to a less pronounced extent as a result of aging in comparison with the compressible material 134. Furthermore, the arrangement of at least one spring makes it possible to avoid, or compensate for, a possibly non-planar (tilted) arrangement of the compressible material or inhomogeneities of the compressible material.

FIG. 5b) likewise illustrates two fastening means 135. In contrast to FIG. 5a), however, in this case a fastening means 135 connects a respective element 132 to the steering-wheel frame 131. It is possible here for the steering-wheel frame 131 to be formed in one or more parts. The element 132 illustrated at the top of FIG. 5b) is fastened on the steering-wheel frame 131 essentially centrally (as seen along the direction in which it extends) by way of a fastening means 135. The two ends of the element 132 are freely movable and are movable in relation to the steering-wheel frame 131.

In the rest state, the free ends of the element 132 are spaced apart from the steering-wheel frame 131 to a more pronounced extent than the central region of the element 132, the fastening means 135 being arranged in said central region. The element 132 illustrated at the bottom of FIG. 5b) is fastened on the steering-wheel frame 131 at one of its ends (as seen along the direction in which it extends) by way of a fastening means 135. Starting from this end, the distance between the steering-wheel frame 131 and the element 132 increases to the other end of the element 132. As an alternative, it is possible for the distance between the steering-wheel frame 131 and the element 132 to remain essentially constant in the region between the two ends of the element 132. It is also the case in this exemplary embodiment that at least one spring 4 can be arranged between the steering-wheel frame 131 and the element 13.

FIGS. 6a) to 6c) use a number of examples to depict the action of the protrusions 1321. FIG. 6a) shows the element 132 and the steering-wheel frame 131 from FIG. 2. Here, a force F, which stems for example from a vehicle driver's hand placement on the steering wheel 1, acts in the direction of the steering-wheel frame 131, on that side of the element 132 which is directed away from the steering-wheel frame 131. The force F here is directed along an axis along which the centrally arranged protrusion 1321 of the three protrusions 1321 projects beyond the groove 1311. Since the other two protrusions 1321 are each arranged essentially perpendicularly to the central protrusion 1321, the force F is directed perpendicularly to the axis along which these two protrusions 1321 project beyond the groove 1311. The action of force illustrated in FIG. 6a) moves the element 132 onto the steering-wheel frame 131, as a result of which the electrically non-conductive material 134 between the element 132 and the steering-wheel frame 131 is compressed. An action of force like that illustrated in FIG. 6a) arises, for example, when a hand encloses the steering wheel 1 uniformly.

FIG. 6b) also shows the element 132 and the steering-wheel frame 131 from FIG. 2. Here, rather than acting along just one axis, the force F acts at least along two axes, as is, for example, the case when the hand moves around the cross section of the steering-wheel rim 13. Rather than acting axially along the direction in which the centrally arranged protrusion 1321 extends (as in FIG. 6a)), the force therefore acts at an angle to said direction. In particular the centrally arranged protrusion 1321 here acts like a lever and transmits the force F to the entire element 132, as result of which the element 132 pivots in the groove 1311 in accordance with the double arrows illustrated in FIG. 6b). The pivoting movement here is limited, in particular, by the two protrusions 1321 which are oriented essentially perpendicularly to the centrally arranged protrusion 1321.

Figure 6C:
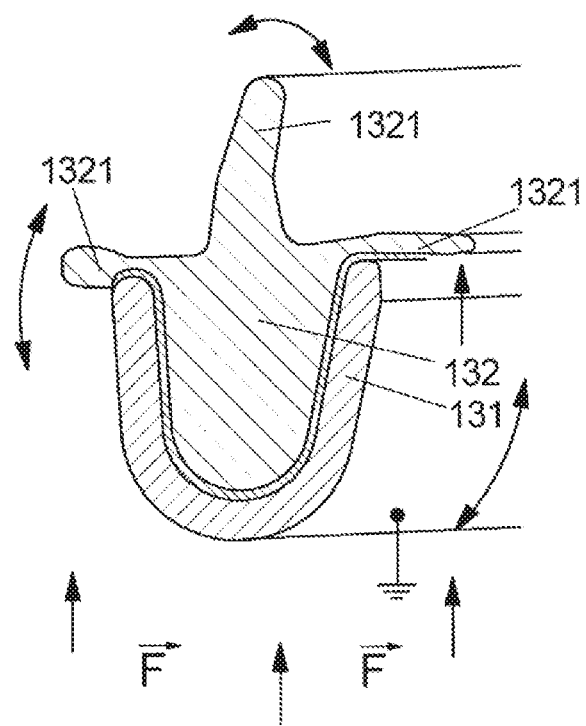
FIG. 6C shows a further example of the action of force on the steering-wheel rim from FIG. 2.

FIG. 6c) shows the steering-wheel frame 131 from FIG. 2 and an element 132 which differs from that in FIG. 2 in that the protrusions 1321 are each designed to be longer. The two protrusions 1321 which are adjacent to the steering-wheel frame 131 here project laterally beyond the outer surface of the steering-wheel frame 131. If either of these two protrusions 1321 is subjected to a force which is directed away from the steering-wheel frame 131, then this action of force results in the element 132 pivoting in the groove 1311. The pivoting movement is limited by the respectively other one of the two protrusions 1321 which are adjacent to the steering-wheel frame 131.

Figure 7:
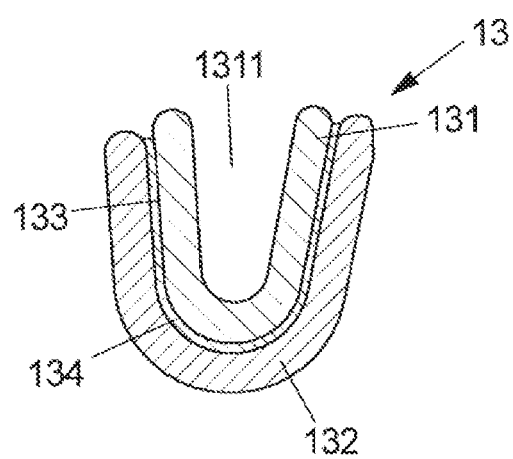
FIG. 7 shows, schematically, a cross section through a steering-wheel rim having a steering-wheel frame and an element in the form of an overlay according to one embodiment.

FIG. 7 illustrates a steering-wheel rim 13 which differs from that in FIG. 2 in that the element 132 is designed in the form of an overlay. The overlay is spaced apart from the outer surface of the steering-wheel frame 131. An electrically non-conductive film 134 is arranged in the interspace 133 between the steering-wheel frame 131 and the element 132. As in the embodiment from FIG. 2, the steering-wheel frame 131 has a groove 1311. However, the steering-wheel frame 131 can also be formed without a groove. In this case, the overlay 132 can enclose the steering-wheel frame 131 completely (as seen in the circumferential direction of the cross section). Those features of the embodiment from FIG. 2 which are described in relation to FIGS. 3, 4 and 5 can likewise be applied to the embodiment from FIG. 7.

In FIG. 7, the overlay 132 does not project either into the groove 1311 or beyond the steering-wheel frame 131.

According to one embodiment, the overlay 132, like the inlay 132, can have protrusions 1321, which can be distributed (uniformly) over the overlay 132 for example in the circumferential direction of the cross section of the steering-wheel frame 131. It is possible here for the protrusions 1321 to be directed essentially radially outward and/or to project, in the form of an extension of the overlay 132, beyond the steering-wheel frame 131.

Figure 8:
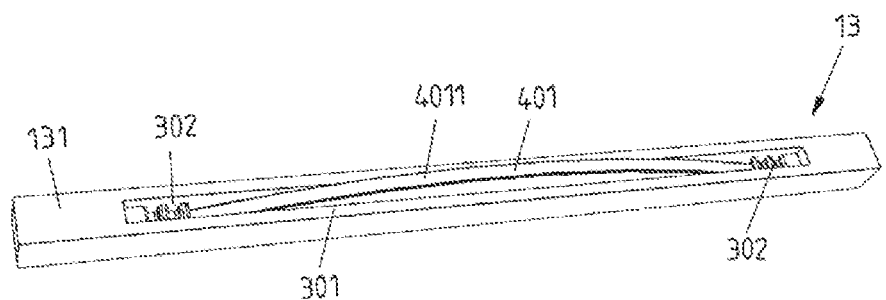
FIG. 8 shows, schematically, a portion of a steering-wheel rim of a steering wheel according to the invention.

That frame 131 of the steering-wheel rim 13 which is illustrated in part in FIG. 8 has, on one side, a groove-like aperture 301, in which is arranged an elastic component in the form of a leaf spring 401, said elastic component being adapted to the dimensions of the aperture 301.

The leaf spring 401 is a constituent part of a capacitive sensor element for determining whether the vehicle driver is approaching and/or making contact with (by hand placement) the steering wheel. In particular, the leaf spring 401 is formed from an electrically conductive material (for example a metal) and forms one electrode of the sensor element. The other electrode of the sensor element is formed by the likewise electrically conductive steering-wheel frame 131. By virtue of a voltage being applied between the leaf spring 401 and the steering-wheel frame 131, it is possible to detect a change in particular in a capacitance formed by the leaf spring 401 and the steering-wheel frame 131, or in the electric field in the region of this capacitance.

This capacitance depends, for example, on the distance between the leaf spring 401 and the steering-wheel frame 131, and it is therefore possible to detect contact with the steering wheel (the steering-wheel rim), which is accompanied by a decrease in the distance between the leaf spring 401 and the steering-wheel frame 131. For example, the leaf spring 401 is formed (e.g. curved) such that it has a portion 4011 projecting out of the aperture 301. However, this is not imperative.

The leaf spring 401 has its end secured on the steering-wheel frame 131, the steering-wheel frame 131 having corresponding fastening structures 302 which fix the leaf spring 401, for example with clamping action, in the aperture 301. In particular, the leaf spring 401 is subjected to prestressing as a result of being fixed via the fastening structures 302. As shown in FIG. 8, a plurality of fastening structures arranged one behind the other can be present on either side of the leaf spring 401, and this makes it possible to set different levels of prestressing for the leaf spring 401.

In addition, at least one mass element (not illustrated) for setting the vibration frequency and/or the inertia of the steering wheel can be coupled to the steering-wheel rim 131 by the leaf spring 401. It would likewise be possible for the mass element to be arranged, for example at least to some extent, in the aperture 301. Such a mass element, however, is merely optional. It would thus also be possible for the leaf spring 401 just to be covered by a foam material of the steering-wheel rim. It is also possible for a portion of the leaf spring 401 to form such a mass element.

It is pointed out that, in order to illustrate the invention, FIG. 8 does indeed show an elongate portion of the steering-wheel rim. However, the rim of a steering wheel is usually curved, as is illustrated, for example, in FIG. 9.

Figure 10:
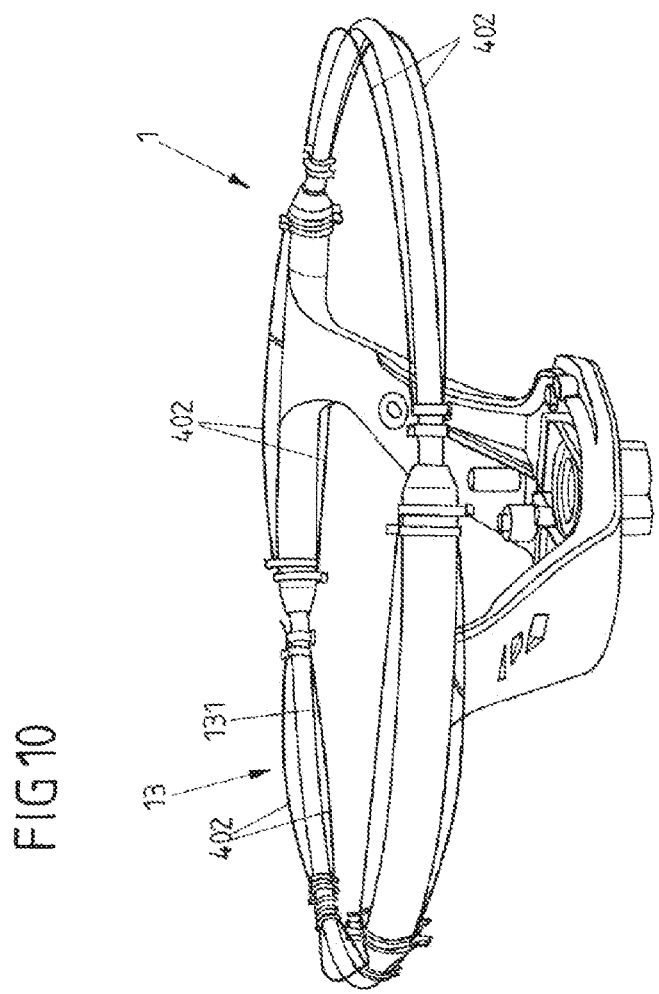
FIG. 10 shows a perspective view of a steering wheel according to a different configuration of the invention.

A complete steering-wheel-rim frame 131 is shown in FIG. 10, where a number of pairs of springs in the form of respectively elongate spring elements 402 or leaf springs are present. The spring elements 402 each have their ends fastened on the steering-wheel frame 131 such that the spring elements 402 extend from the steering-wheel frame 131 at a distance which increases toward their centre. In particular, the spring elements 402 of a pair are located on different sides of the steering-wheel frame 131 (e.g. on the front side of the steering wheel 1, i.e. the side which is directed toward the vehicle driver, or on the rear side of the steering wheel 1).

Figure 9:
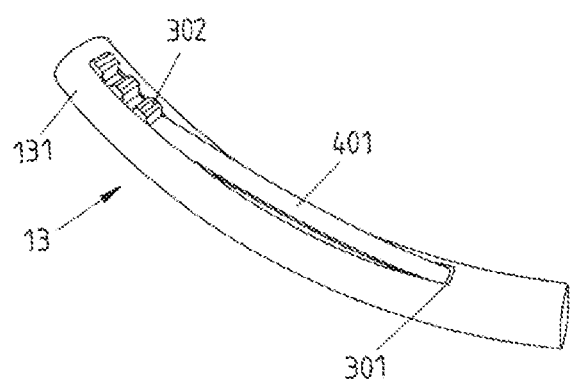
FIG. 9 shows a modification of FIG. 8.
Figure 11:
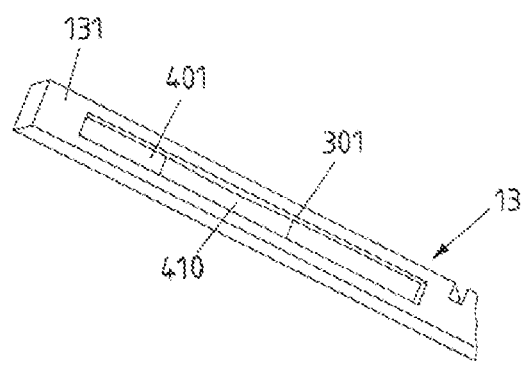
FIG. 11 shows, schematically, a perspective view of a portion of a rim of a steering wheel according to one exemplary embodiment of the invention.

In a manner analogous to FIGS. 8 and 9, the pairs of spring elements 402 each form (together with the steering-wheel frame 131), for example, a capacitive or resistive contact sensor. FIG. 11 shows an example of a depression 301 of the steering-wheel frame 131 for accommodating an elastic or elastically mountable component of the sensor element (e.g. the leaf spring 401 of FIG. 12).

Figure 12:
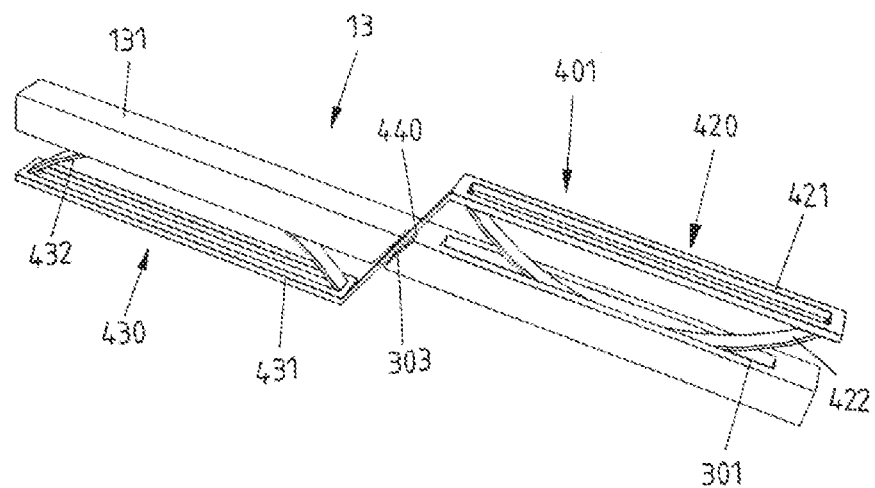
FIG. 12 shows, schematically, a perspective view of a portion of a rim of a steering wheel according to a further exemplary embodiment of the invention.

The spring 401 (e.g. in the form of a leaf spring) which is illustrated in FIG. 12, and is likewise designed in the form of a constituent part of a contact sensor, comprises two sub-regions 420, 430, which are located on mutually opposite sides of the steering-wheel rim 131. The sub-regions 420, 430 each have a first portion and a second portion 421, 422 and 431, 432, respectively, wherein the first portions 421, 431 each run around the second portion 422, 432 in the manner of a frame.

The second portions 422, 432 each have a curved section, which extends into aperturees 301 of the steering-wheel frame 131 and which butts against the steering-wheel frame (against a floor of the apertures 301). It is also conceivable, however, for the apertures 301 to be designed, at least to some extent, in the form of through-openings, through which the second portions 422, 432 of the spring 401 extend at least in part. The curved second portions 422, 432 have their ends connected elastically (and in one piece) to the first portions, and therefore the sub-regions 420, 430 of the spring 401 are each of "inherently resilient" design. The curved, resilient second portions 422, 432 are formed, for example, by being cut out of a sub-region of the spring 401.

The sub-regions 420, 430, in turn, are connected to one another in one piece via a connecting portion 440 of the spring 401, wherein the connecting portion 440 runs laterally past the steering-wheel frame 131 (FIG. 13) or runs, at least in part, through a lateral aperture 303 of the steering-wheel frame 131. In the event of contact being made with the steering-wheel rim 13, the first portion of the first and/or second sub-region 420, 430 approaches the steering-wheel frame, and the contact can therefore be detected, as explained above. It is also conceivable for the spring 401 to have just one portion (i.e. just a curved portion) formed in the manner of the sub-regions 420, 430.

FIG. 14 shows a further variant of the elastic or elastically mounted component (spring 401). According to this figure, the spring 401 has two sub-regions 440, 450, which each extend at a distance from the steering-wheel frame 131 on mutually opposite sides 1300, 1400 (in particular the front side and rear side) of the steering-wheel frame 131. The two sub-regions 440, 450 are connected to one another in one piece via a connecting portion 460. The connecting portion 460 runs, in particular, likewise outside the steering-wheel frame 131, wherein it can be connected to the same in a pivotable manner (via a bearing 470).

Figure 15:
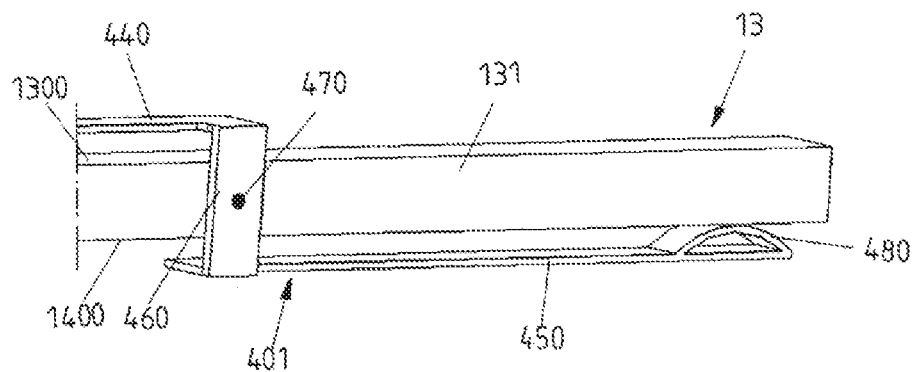
FIG. 15 shows a modification of FIG. 14.
Figure 16:
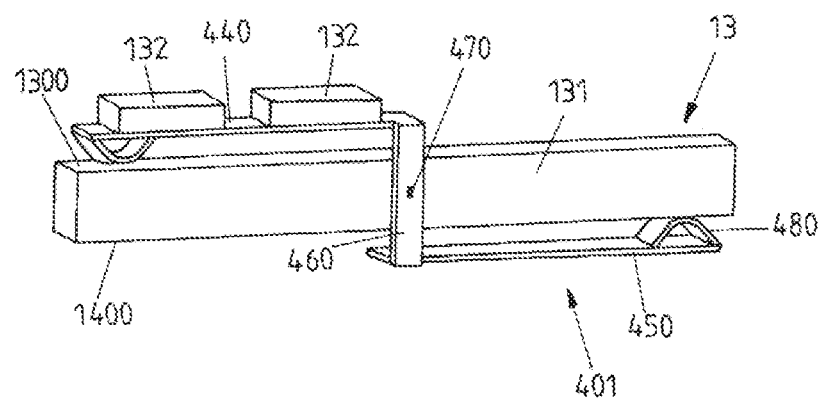
FIG. 16 shows a further modification of FIG. 14.

In addition, at least one of the sub-regions 440, 450 can have an elastic section 480, via which they come into abutment against the steering-wheel frame 131 in the region of the spring 401 and serve, in particular, to prestress the spring 401. The elastic section 480 is formed, for example, by virtue of one end of the sub-region 440, 450 being bent over, as is shown in FIG. 15. At least one of the sub-regions 440, 450 can also be coupled to at least one element 132 for setting the vibration frequency and/or the inertia of the steering wheel (FIG. 16). At least one element for setting the vibration frequency and/or the inertia of the steering wheel could also be arranged on an inner side of the sub-regions 440, 450, i.e. between the steering-wheel frame 1313 and the sub-region 440, 450.

Figure 17A:
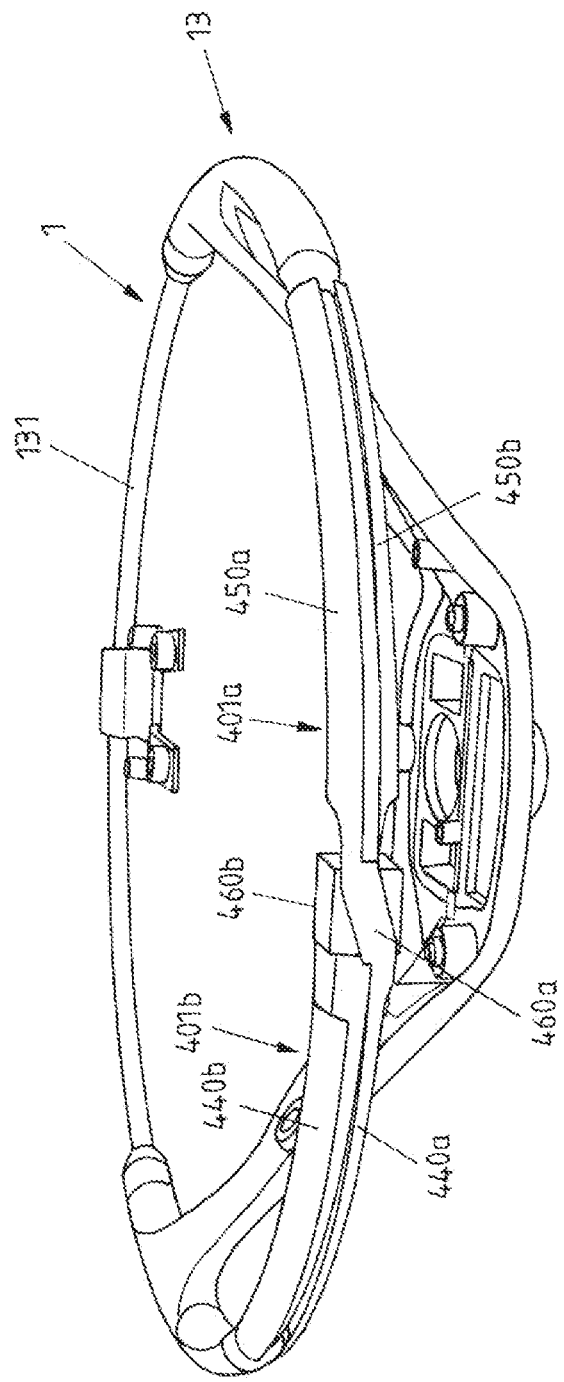
FIG. 17A shows a perspective view of a steering wheel having a spring element configured according to FIG. 14.

It is also conceivable for two springs 401a, 401b to be arranged on the same region of the steering-wheel rim 13, to be precise such that a respective sub-region 440a, 450a of the one spring 401a is located opposite a portion 440b, 450b of the other spring 401b; cf. FIG. 17A. The springs 401a, 401b are designed, in particular, in a manner analogous to the spring of FIGS. 14 and 15. For example, the portions 440a, 450a and 440b, 450b are connected to one another in each case via a connecting portion 460a, 460b.

Figure 17B:
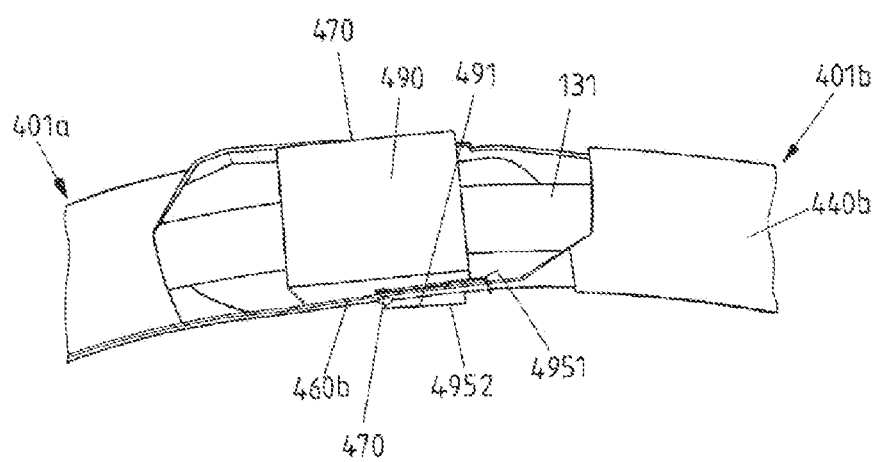
FIG. 17B shows a detail of the steering wheel from FIG. 17A as seen from above.

In addition, can it is also possible for the springs 401a, 401b to be mounted on the steering-wheel frame 131 in a pivotable manner via a bearing 470 (which defines a bearing axis) of a bearing element 490; cf. FIG. 17B, which shows the bearing 470 located on an inner side of the steering-wheel frame 131. Furthermore, the region of the bearings 470 can each contain a bearing spring 495, which subjects the respective spring 401a, 401b to a restoring force. It is pointed out here that, instead of the springs 401a, 401b, it would also be possible to use essentially rigid elements, although these are mounted elastically via the bearing springs 495 (of which only the one, inner bearing spring is visible in FIG. 17B). This applies analogously to the exemplary embodiments above and those which follow. The inner bearing spring 495 (in a manner analogous to the outer bearing spring (not illustrated)) in particular has one end 4951 coupled to the spring 401b and has another end 4952 coupled to a protrusion 491 of the bearing element 490.

Figure 18:
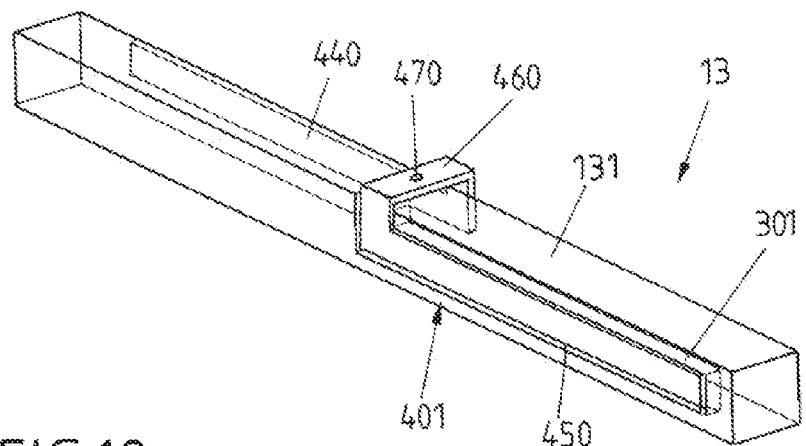
FIG. 18 shows, schematically, a perspective view of a portion of a rim of a steering wheel according to yet another exemplary embodiment of the invention.
Figure 19:
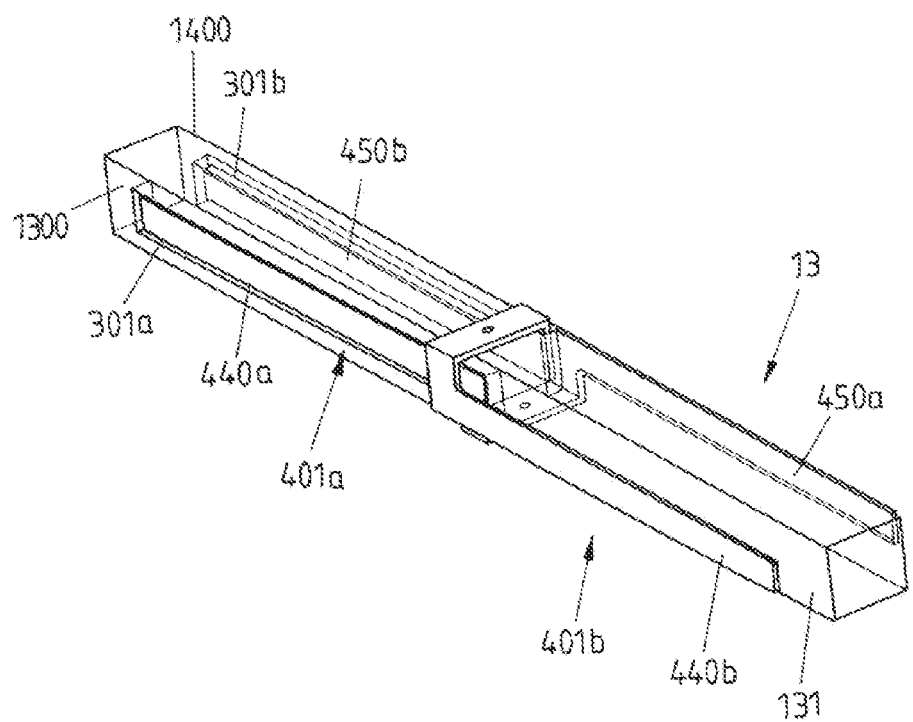
FIG. 19 shows a modification of FIG. 18.

FIGS. 18 and 19 relate to further modifications of the spring 401. According to FIG. 18, the spring 401, in a manner analogous to FIG. 14, has a first and a second sub-region 440, 450. The second sub-region 450, however, runs in an aperture 301 of the steering-wheel frame 131, whereas the first sub-region 440 extends at a distance from the steering-wheel frame 131.

Figure 20:
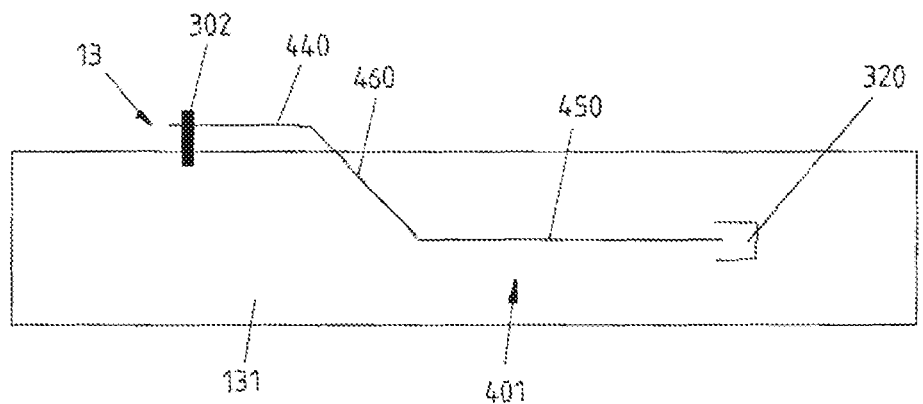
FIG. 20 shows, schematically, a view of a portion of a rim of a steering wheel according to a further exemplary embodiment of the invention.

It is also possible for one of the sub-regions 440, 450 of the spring 401 to be arranged in its entirety in the interior of the steering-wheel frame 131, i.e. to be at least essentially fully enclosed by the steering-wheel frame 131 (FIG. 20). One end of the lever-like portion 440 of the spring 401 is secured on an outer side of the steering-wheel frame 131 via a fastening structure 302, whereas the other end is coupled to an internal fastening structure 3020. It is also the case that the spring 401 is subjected to prestressing via the fastening structures 302, 3020.

According to the exemplary embodiment of FIG. 19, two springs 401a, 401b are present, in each case one of their sub-regions 440a, 440b, 450a, 450b (that is to say the sub-regions 440a, 450b which are located on mutually opposite sides 1300, 1400 of the steering-wheel frame 131) being arranged in an aperture 301a, 301b of the steering-wheel frame 131. It is also conceivable for the sub-regions 440a, 440b and 450a, 450b arranged on the same side of the steering-wheel frame 131 each to run in an aperture of the steering-wheel frame 131. Furthermore, it is possible for the two springs 401a, 401b to belong to different sensor elements. This makes it possible, for example, to distinguish whether merely contact has been made with the steering-wheel rim (just one of the sensor elements reacts) or said rim has been gripped (both sensor elements react). Accordingly, the regions where the springs 401a, 401b overlap can contain electrical insulation, which insulates the springs 401a, 401b electrically from one another.

Figure 21:
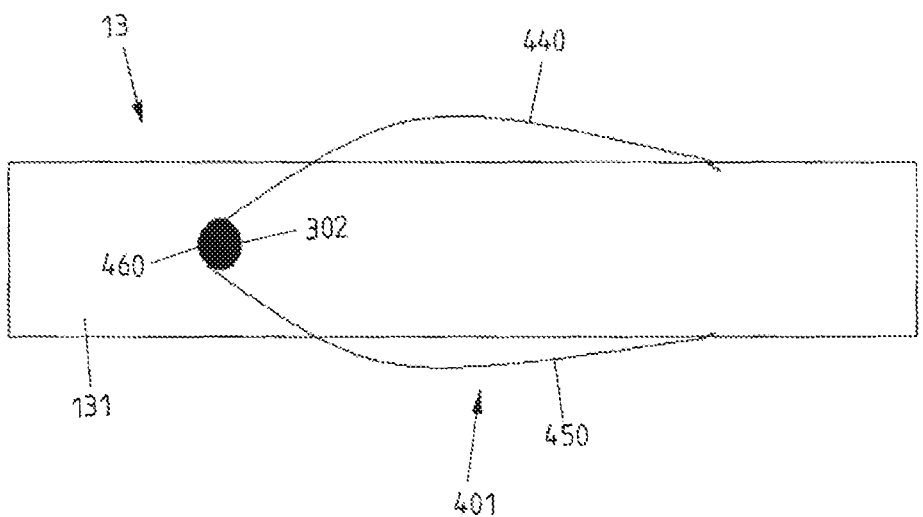
FIG. 21 shows a modification of FIG. 20.

It is also possible (FIG. 21) for the sub-regions 440, 450 of the spring 401 to be located opposite one another on different sides of the steering-wheel frame 131. Here, the sub-regions 440, 450 are coupled to one another in the manner of a pair of bayonet scissors via an elastic connection 460, which is located inside or outside the steering-wheel frame 131, and are mounted on the steering-wheel frame 131 via a fastening structure 302.

The mounting via the fastening structure 300 need not be provided absolutely centrally in relation to the sub-regions 440, 450. Rather, the level of prestressing of the sub-regions 440, 450 can be set via the position of the fastening structure 302. It is conceivable to use a sensor element which comprises the spring 401 of FIG. 21 (in a manner analogous to the exemplary embodiments above) to draw a distinction between approach toward, mere contact with, or gripping of, the steering-wheel rim (e.g. on the basis of the capacitance changing to different extents). The sensitivity of the sensor element can be set via the level of prestressing of the spring 401.

It is pointed out that the spring 401 in all the exemplary embodiments above, in a manner analogous to FIG. 16, can additionally serve for coupling at least one element for setting the vibration frequency and/or the inertia of the steering wheel. Furthermore, the exemplary embodiments explained above can be realized in an analogous manner if, instead of the spring 401, use is made of a different type of spring (e.g. a helical spring or an elastic wire). It is also conceivable, as already mentioned above, for use to be made, instead of the spring 401, of a component which has a low level of inherent elasticity, but is mounted elastically (in particular via at least one spring).

The invention claimed is:

1. A steering wheel for a motor vehicle, having a steering-wheel frame and at least one element for setting the vibration frequency and/or the inertia of the steering wheel,
   wherein the at least one element is electrically conductive and is part of a sensor element,
   wherein the sensor element is designed to determine a vehicle driver's hand placement on the steering wheel,
   and wherein the steering-wheel frame and the at least one element form electrodes of the sensor element for capacitive, inductive or resistive measurement in order to determine the vehicle driver's hand placement on the steering wheel.

2. The steering wheel as claimed in claim 1, wherein the at least one element is formed to have a shape that is complementary to a shape of at least one portion of the steering-wheel frame,
   wherein the at least one element and the at least one portion of the steering-wheel frame are spaced apart from one another by essentially the same distance over their entire extent.

3. The steering wheel as claimed in claim 1, wherein the steering-wheel frame is electrically conductive.

4. The steering wheel as claimed in claim 1, wherein the at least one element is fastened on the steering-wheel frame such that the at least one element is movable in relation to the steering-wheel frame.

5. The steering wheel as claimed in claim 1, wherein the steering-wheel frame has a groove, which is formed along a direction in which the steering-wheel frame extends, wherein at least part of the at least one element is arranged in the groove.

6. The steering wheel as claimed in claim 1, wherein the steering wheel comprises a steering-wheel rim, via which the vehicle driver can grip the steering wheel, wherein the steering-wheel rim comprises the steering-wheel frame and the at least one element.

7. A steering wheel, having a steering-wheel frame and a sensor element, wherein the sensor element comprises at least one elastic and/or elastically mounted component, which is arranged, at least to some extent, within the steering-wheel frame or in an aperture of the steering-wheel frame and/or which extends, at least to some extent, outside, and along, the steering-wheel frame,
   wherein at least one element for setting the vibration frequency and/or the inertia of the steering wheel is coupled to the steering-wheel frame via the component or the component itself forms at least one element for setting the vibration frequency and/or the inertia of the steering wheel.

8. The steering wheel as claimed in claim 7, wherein the component has a first sub-region extending within, or in the aperture of, the steering-wheel frame and has a second sub-region extending outside the steering-wheel frame.

9. The steering wheel as claimed in claim 7, wherein at least one of the following: the component has two portions connected to the steering-wheel frame, and the component has a first portion and a second portion, which is connected elastically to the first portion and is curved.

10. The steering wheel as claimed in claim 7, wherein the component has a first sub-region extending on a first side of the steering-wheel frame and has a second sub-portion extending on a second side of the steering-wheel frame, said second side being directed away from the first side.

11. The steering wheel as claimed in claim 10, wherein the first sub-region and the second sub-region are connected to one another via a connecting portion, wherein a spring is mounted on the steering-wheel frame via the connecting portion.

12. The steering wheel as claimed in claim 7, wherein the sensor element is a capacitive or resistive sensor, wherein the component forms one electrode of the sensor element.

13. The steering wheel as claimed in claim 7, wherein the component is a spring.

14. A steering wheel for a motor vehicle, having a steering-wheel frame and at least one element for setting the vibration frequency and/or the inertia of the steering wheel,
   wherein the at least one element is electrically conductive and is part of a sensor element,
   wherein the sensor element is designed to determine a vehicle driver's hand placement on the steering wheel,
   and wherein the at least one element is arranged at a distance from the steering-wheel frame, an interspace thus being formed between the at least one element and the steering-wheel frame.

15. The steering wheel as claimed in claim 14, wherein at least one of the following: an electrically non-conductive material is arranged in the interspace, a compressible material is arranged in the interspace, and at least one spring, via which the at least one element can be subjected to a restoring force, is arranged in the interspace.

16. A steering wheel for a motor vehicle, having a steering-wheel frame and at least one element for setting the vibration frequency and/or the inertia of the steering wheel,
   wherein the at least one element is electrically conductive and is part of a sensor element,
   wherein the sensor element is designed to determine a vehicle driver's hand placement on the steering wheel,
   and wherein the at least one element is formed by a spring.

17. A steering wheel for a motor vehicle, having a steering-wheel frame and at least one element for setting the vibration frequency and/or the inertia of the steering wheel,
   wherein the at least one element is electrically conductive and is part of a sensor element, and
   wherein the at least one element is fastened on the steering-wheel frame, wherein the at least one element and the steering-wheel frame are connected in an electrically non-conductive manner.

* * * * *